Figure 1:
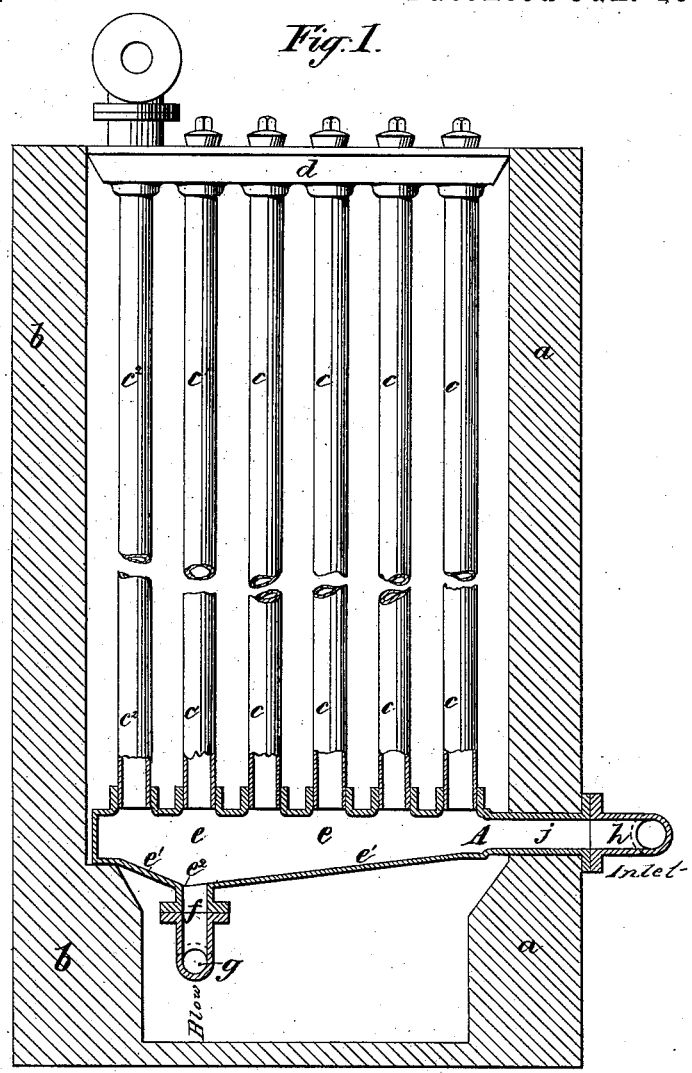

(No Model.)

A. LOWCOCK & T. SYKES.
FUEL ECONOMIZER.

No. 334,533. Patented Jan. 19, 1886.

Witnesses. Inventors.

UNITED STATES PATENT OFFICE.

ARTHUR LOWCOCK, OF SHREWSBURY, COUNTY OF SALOP, AND THOMAS SYKES, OF MANCHESTER, COUNTY OF LANCASTER, ENGLAND.

FUEL-ECONOMIZER.

SPECIFICATION forming part of Letters Patent No. 334,533, dated January 19, 1886.

Application filed August 12, 1885. Serial No. 174,219. (No model.) Patented in England March 4, 1885, No. 2,875.

*To all whom it may concern:*

Be it known that we, ARTHUR LOWCOCK, of the Economizer Works, Shrewsbury, in the county of Salop, England, engineer, and THOMAS SYKES, of 25 Milton Street, Stockport Road, Manchester, in the county of Lancaster, England, engineer, subjects of the Queen of the United Kingdom of Great Britain and Ireland, have invented certain new and useful improvements in the apparatus known as "Fuel-Economizers," and used for heating water and generating steam, which improvements are also applicable to other apparatus similar in construction to the apparatus known as "fuel-economizers," and used for heating and purifying water, (for which improvements we have obtained Letters Patent of Great Britain and Ireland, No. 2,875, dated March 4, 1885,) of which the following is a specification.

This invention relates to the apparatus known as "fuel-economizers" for heating water or generating steam by means of the waste heated gases of combustion from steam-boiler or other furnaces, such apparatus consisting of what are commonly designated as "bottom boxes" and "top boxes" and upright tubes connecting and forming communication between said bottom boxes and top boxes, the said apparatus being placed where it is surrounded by the escaping heated gases, and the water to be heated circulating through the said apparatus from bottom to top, and the solid impurities separated from the water while being heated being received in the bottom boxes, whence they are blown out or withdrawn at suitable intervals of time.

In such apparatus the water to be heated is commonly introduced through an inlet on one side of the bottom box, and the impurities tend to collect in the opposite side of the said box under the tubes farthest from the inlet and in the lower parts of the said tubes.

The object of our invention is to prevent the impurities from so collecting, and to provide for the free discharge of the impurities from said tubes and prevent such accumulation in the form of mud under the said tubes as to check the free circulation of water through them; and to this end our invention consists in the combination hereinafter described and claimed, the principal characteristics of which are, that the blow-off or mud pipe is under those of the tubes which are farthest from the water-inlet, and that the portion of the bottom of the bottom box with which the said pipe is connected is the lowest portion thereof, so that there is ample space for the free discharge of the impurities from the said tubes and for their collection below the said tubes in such manner as not to choke them.

In order that our invention may be fully understood and readily carried into effect, we will now proceed to describe the same by reference to the drawings hereunto annexed, in which drawings—

Figure 2:
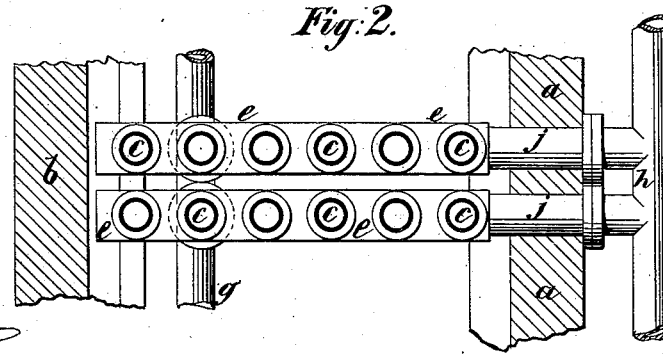

Figure 1 is a vertical cross-section, and Fig. 2 a plan, of so much of a fuel-economizer as is required to illustrate our invention.

Similar letters of reference designate corresponding parts in both figures.

$a$ $b$ are the walls of a flue or heating-chamber, within which the fuel-economizer is placed to be heated by the escaping heated gaseous products of combustion. The vertical pipes $c$ $c'$ $c^2$ communicate at their upper ends with the top boxes, $d$, of which top boxes $d$ one only is shown in the drawings, and at their lower ends the vertical pipes $c$ communicate with the bottom boxes, $e$, of which bottom boxes $e$ one only is shown in Fig. 1, while two are shown in the plan Fig. 2. The vertical pipes $c$ $c'$ $c^2$ are connected in any suitable and convenient manner to the top boxes, $d$, and bottom boxes, $e$. We form the bottom $e'$ of each of the bottom boxes $e$, so that such bottom $e'$ slopes or is inclined toward the blow-off or mud pipe $f$, which blow-off or mud pipe $f$ communicates with the blow-off or mud pipe $g$. The water to be heated while circulating or passing through the vertical pipes $c$ $c'$ $c^2$ is supplied to the bottom boxes, $e$, by means of the pipe $h$, which communicates with the interiors of the bottom boxes, $e$, by means of the pipes $j$. We place the lowest part, $e^2$, of the bottom $e'$ of each of the bottom boxes, $e$, and each of the blow-off or mud pipes $f$ so that they shall be situate below those vertical pipes $c'$ $c^2$ which are farthest from the point, A, at which the feed-water enters each of the bottom boxes, $e$, and by so placing the lowest part, $e^2$, of the bottom $e'$ of each of the bottom boxes, $e$, and each of the blow-off or mud pipes $f$ we hinder or prevent the vertical pipes $c'$ $c^2$ which are farthest from the point, A, at which the feed-water enters each of the bottom boxes, $e$, from becoming filled with and choked by the impurities separated from the water while being heated in the fuel-economizer as readily as they have hitherto been. The impurities separated from the water while being heated in the fuel-economizer, which impurities are deposited in the bottom boxes, $e$, are blown off from time to time by means of the blow-off or mud pipes $f$.

What we claim as our invention is—

The combination, with the vertical tubes $c$ $c'$ $c^2$, of the bottom box, $e$, provided with an inlet-pipe, $j$, and having the lowest part, $e^2$, of its bottom and the blow-off or mud pipe $f$, which is connected therewith, situate under those of the said vertical tubes which are farthest from the inlet-pipe $j$, substantially as and for the purpose herein described.

ARTHUR LOWCOCK.
THOMAS SYKES.

Witnesses:
 ARTHUR SYKES,
3 *Exchange Buildings, Manchester.*
 W. T. CHEETHAM,
*Patent Agent*, 18 *St. Ann's St., Manchester.*